US006535911B1

(12) United States Patent
Miller et al.

(10) Patent No.: US 6,535,911 B1
(45) Date of Patent: Mar. 18, 2003

(54) VIEWING AN INFORMATION SET ORIGINATED FROM A DISTRIBUTION MEDIA AND UPDATING USING A REMOTE SERVER

(75) Inventors: Grant D. Miller, Littleton, CO (US); John M. Salvadore, Boulder, CO (US); Marc L. Steinbrecher, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,768

(22) Filed: Aug. 6, 1999

(51) Int. Cl.[7] .............................................. G06F 15/16
(52) U.S. Cl. ...................... 709/217; 709/201; 709/202; 709/203; 709/218; 709/219; 709/248; 707/201; 707/202; 707/203; 717/212; 717/168; 717/173; 717/174
(58) Field of Search ................................ 709/201–203, 709/218–219, 248, 217; 707/201–203; 717/212, 168, 173–174

(56) References Cited

U.S. PATENT DOCUMENTS

| | | | |
|---|---|---|---|
| 5,319,542 A | 6/1994 | King, Jr. et al. | 364/401 |
| 5,528,490 A | 6/1996 | Hill | 364/403 |
| 5,668,592 A | 9/1997 | Spaulding, II | 348/13 |
| 5,694,546 A | 12/1997 | Reisman | 395/200.9 |
| 5,761,649 A | 6/1998 | Hill | 705/27 |
| 6,125,388 A * | 9/2000 | Reisman | |
| 6,272,536 B1 * | 8/2001 | van Hoff et al. | 709/217 |
| 6,202,207 B1 * | 3/2002 | Donahue | 717/173 |

OTHER PUBLICATIONS

"Database National Language Support", IBM Technical Disclosure Bulletin, vol. 37, No. 8, Aug., 1994, pp 631–634.
"Method to Maximize CD–ROM System Performance", IBM Technical Disclosure Bulletin, vol. 38, No. 1, Jan., 1995, pp 393–394.

* cited by examiner

Primary Examiner—Moustafa M. Meky
Assistant Examiner—Hien Le
(74) Attorney, Agent, or Firm—Blakely Sokoloff Taylor Zafman LLP

(57) ABSTRACT

Automated computerized methods, computer-readable medium containing computer-executable instructions, and apparatus are disclosed for viewing an information set originated from a distribution media and updating using remote server. Initially, an information set is viewed from a standalone distribution media. A user can select all, or one or more components to be updated from a remote server. The local computer system is then updated with a modified index from the local computer referencing the original distribution media and received files kept in local storage. This update process is efficiently performed, and provides for resumption of downloads in the middle of sets of files, or even within a single file. Additionally, when the viewing system includes a standard browser, a proxy agent is used to provide access portions of the file system not normally accessible to the browser. The updated information set is then able to be viewed when the computer system is not connected with the remote server.

12 Claims, 6 Drawing Sheets

VIEWING AN INFORMATION SET ORIGINATED FROM A DISTRIBUTION MEDIA AND UPDATING USING A REMOTE SERVER

FIELD OF THE INVENTION

This invention relates to computer programming and systems; and more particularly, to computerized methods, computer-readable medium containing computer-executable instructions, and apparatus for viewing an information set originated from a distribution media and updating using a remote server.

BACKGROUND OF THE INVENTION

Compact disks (CDs) are used extensively for distributing information to businesses and homes. For example, some businesses deliver information and product updates to customers on CDs on a quarterly basis. A problem with this technique is that the information contained on many types of CDs becomes outdated, especially when the information is time-sensitive (e.g., pricing information, or new products or features are added). In certain scenarios, customers then only receive updates every few months.

Various techniques are available for downloading updates to software for example, but these techniques do not efficiently update the files, nor provide a platform independent mechanism. Needed are improved automated systems and for viewing an information set originated from a distribution media (i.e., compact disks, digital versatile disks, etc.) and updating using a remote server.

SUMMARY OF THE INVENTION

According to the invention, methods and apparatus are disclosed for viewing an information set originated from a distribution media and updated using a remote server. Embodiments of the present invention include various elements and limitations, with no one element or limitation contemplated as being a critical element or limitation. Each of the claims individually recite an aspect of the present invention in its entirety. Moreover, embodiments of the present invention include methods, computer-readable medium containing instructions for performing the methods, and computer systems for practicing the present invention. The embodiments described hereinafter embody various aspects and configurations within the scope and spirit of the present invention.

According to a first embodiment of the present invention, an automated method and computer-readable medium containing computer-executable instructions are provided for maintaining an updated version of information originated from an original distribution media using a remote server. Preferably, the first embodiment comprises: displaying a representation of the information originated from the original distribution media; maintaining a synchronization file, the synchronization file tracking a set of local files including a file size value and a cyclic redundancy check value for each of the local files; requesting a distribution media update from the remote server, the distribution media update request including an index from the original distribution media and the synchronization file; receiving an updated index from the remote server; receiving one or more files supplementing the information contained on the original distribution media; updating the synchronization file in response to receiving the one or more files; and displaying the updated version of information originated from an original distribution media based on the received updated index and at least one of the received supplemental files.

In an embodiment, the distribution media is a compact disk (CD) or a digital versatile disk (DVD). An embodiment further comprises the step of receiving a selection of items for updating, wherein the update request includes the selection. An embodiment further comprises the step of reverting back to the original distribution media to use the index from the original distribution media; where the steps of reverting back to the original distribution media and displaying the representation of the information originated from the original distribution media are performed after the step of displaying the updated version of information originated from an original distribution media. In an embodiment, the updated index contains relative Universal Resource Locators (URLs) for referencing information contained on the original distribution media, and fully qualified URLs for referencing information on the other data storage. In an embodiment, the remote server maintains no information pertaining to the level of updates received by the computer system. In an embodiment, the received files include a partially received file; and the method further comprises the step of receiving a second transmission from the remote server containing the remaining portion of the partially received file and not containing the received portion of the partially received file. In an embodiment, a first set of files is received supplementing the information contained on the original distribution media in response to a sent first distribution media update request, and a second set of files is received supplementing the information contained on the original distribution media in response to a sent resumption of the sent first distribution media update request.

According to a second embodiment of the present invention, an automated method and computer-readable medium containing computer-executable instructions for a server computer system are provided for supplementing an original distribution media. Preferably, the second embodiment comprises: storing an updated index and an updated synchronization file indicating a new version of the distribution media; receiving a distribution media update request from a client computer, the distribution media update request including an index from the original distribution media and a synchronization file, the synchronization file including a file size value and a cyclic redundancy check value for each of a local storage set of update files; comparing the received original distribution media index with the updated index to generate a modified index; comparing the received synchronization file with the updated synchronization file to determine a download set of files to download to the client computer to supplement the local storage set of updated files; and downloading the modified index and the download set of files to the client computer.

In an embodiment, the distribution media is a compact disk (CD) or a digital versatile disk (DVD). In an embodiment, the step of comparing the received synchronization with the updated synchronization file identifies a file only partially received by the client computer; and the step of downloading the download set of files includes downloading the non-received portion and not downloading the previously received portion of the partially received file. Preferably, the partially received file is identified by comparing a received CRC entry value within the received synchronization file with a corresponding CRC entry value within the updated synchronization file. In an embodiment, the step of comparing the received synchronization file with the updated synchronization file includes comparing a CRC value within a received entry of the received synchronization file with a corresponding updated entry of the updated synchronization file. In an embodiment, the step of comparing the received synchronization file with the updated synchronization file includes comparing a file size value within a received entry of the received synchronization file with a corresponding updated entry of the updated synchronization file. In an embodiment, the distribution media update request includes a selection indicating a subset of the items to be updated, and the generated modified index is updated for the selected subset of items.

According to a third embodiment of the present invention, an automated method and computer-readable medium containing computer-executable instructions are provided for maintaining an updated version of information originated from an original distribution media using a remote server. Preferably, the third embodiment comprises: displaying a representation of the information originated from the original distribution media using a browser; maintaining a synchronization file on a portion of a local storage device not normally accessible by the browser, the synchronization file tracking a set of local files including a file size value and a cyclic redundancy check value for each of the local files; requesting a distribution media update from the remote server, the distribution media update request including an index from the original distribution media and the synchronization file; receiving an updated index from the remote server; receiving one or more files supplementing the information contained on the original distribution media; storing the received one or more files on the secure portion of the local storage device; updating the synchronization file in response to receiving the one or more files; and displaying the updated version of information originated from an original distribution media based on the received updated index and at least one of the received supplemental files stored on the secure portion of the local storage device.

In an embodiment, the distribution media is a compact disk (CD) or a digital versatile disk (DVD). An embodiment further comprises the step of receiving a selection of items for updating, wherein the update request includes the selection. An embodiment further comprises the step of reverting back to the original distribution media to use the index from the original distribution media; where the steps of reverting back to the original distribution media and displaying the representation of the information originated from the original distribution media are performed after the step of displaying the updated version of information originated from an original distribution media. In an embodiment, the updated index contains relative Universal Resource Locators (URLs) for referencing information contained on the original distribution media, and fully qualified URLs for referencing information on the other data storage. In an embodiment, the remote server maintains no information pertaining to the level of updates received by the computer system. In an embodiment, the received files include a partially received file; and the method further comprises the step of receiving a second transmission from the remote server containing the remaining portion of the partially received file and not containing the received portion of the partially received file.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

DETAILED DESCRIPTION OF THE PREFERRED EMBODIMENT

Figure 1:
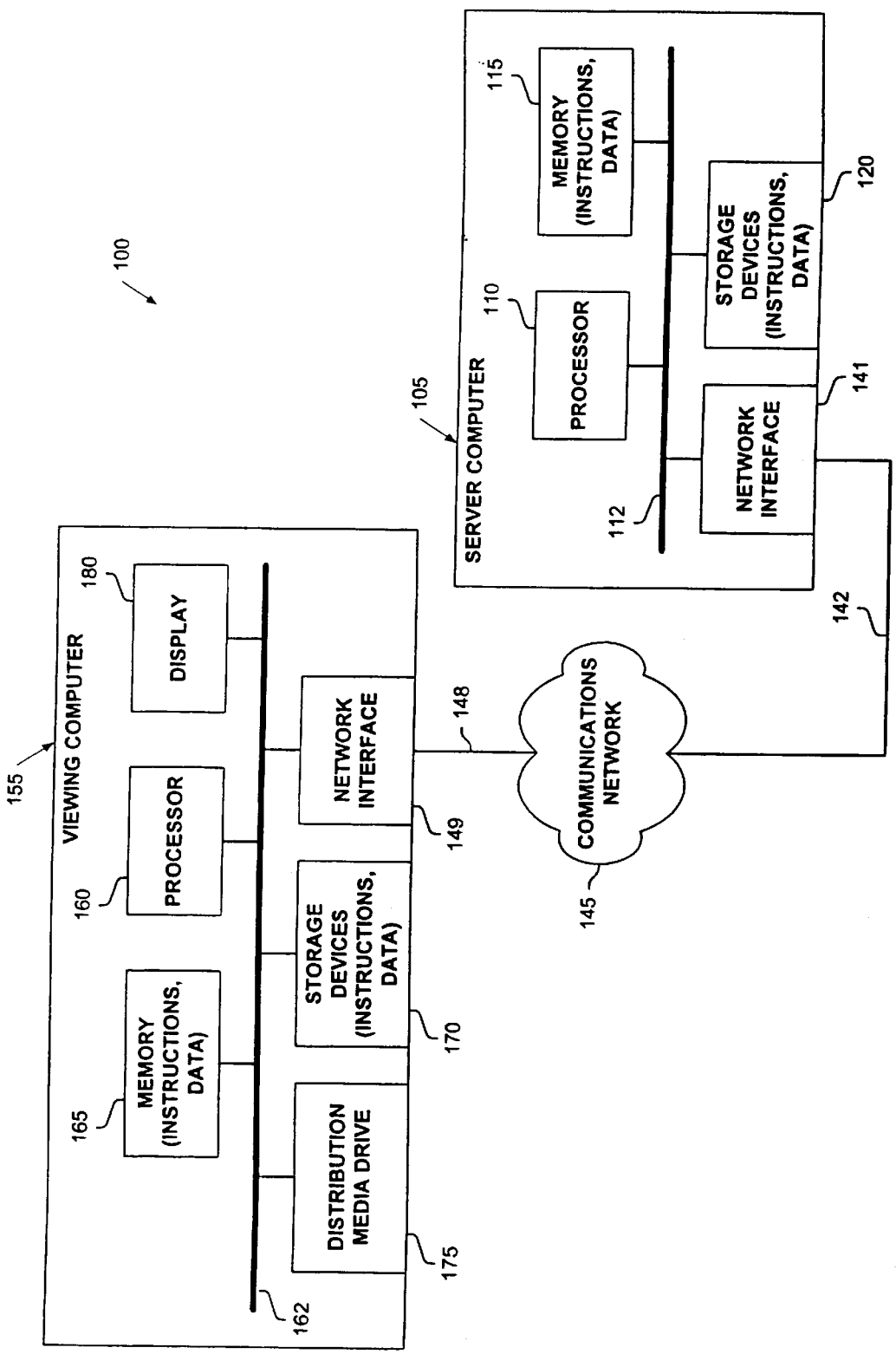
FIG. 1 is a block diagram of an exemplary operating environment in which the invention may be practiced.

FIG. 1 and its discussion herein are intended to provide a description of a general computing environment in which the present invention can be practiced. The present invention is not limited to a single computing environment. Moreover, the architecture and functionality of the present invention as taught herein and would be understood by one skilled in the art is extensible to an unlimited number of computing environments and embodiments in keeping with the scope and spirit of the present invention.

In FIG. 1, an exemplary operating environment is illustrated in which the present invention may be practiced. The present invention provides for various methods, computer-readable medium containing computer-executable instructions, and apparatus for maintaining an updated version of information originated from an original distribution media.

Turning now to FIG. 1, illustrated is an exemplary operating environment and embodiment 100 of the present invention. Illustrated are viewing computer 155, communications network 145, and server computer 105. In an embodiment of the present invention, viewing computer 155 displays an information set originated from a distribution media, receives updates from server computer 105 over network 145, and displays an updated information set comprising information from the original distribution media and received updated information.

Viewing computer 155 typically comprises a standard computer platform or a specialized computer platform, including, but not limited to a desktop computer, a laptop computer, and a handheld computer. In an embodiment, viewing computer 155 comprises a processor 160, memory 165, storage devices 170, a network interface 149, distribution media drive 175, and a display 180, which are electrically coupled via bus 162. Network interface 149 is connected to a communications network 145 (e.g., Internet, email servers, private or public network) over a public or private telephone, cellular, wireless, satellite, local area and/or wide area network connection 148. Memory 165 is one type of computer-readable medium, and typically comprises random access memory (RAM), read only memory (ROM), integrated circuits, and/or other memory components. Memory 165 typically stores computer-executable instructions to be executed by processor 160 and/or data which is manipulated by processor 160 for implementing functionality in accordance with the present invention. Storage devices 170 are another type of computer-readable medium, and typically comprise disk drives, diskettes, networked services, tape drives, and other storage devices. Storage devices 170 typically store computer-executable instructions to be executed by processor 160 and/or data which is manipulated by processor 160 for implementing functionality in accordance with the present invention. Additionally, viewing computer 155, communications network 145, and server computer 105 could be implemented in a single computer platform, with communications network 145 being an internal information sharing mechanism such as message passing or shared memory.

As used herein and contemplated by the present invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Server computer 105 typically comprises a standard computer platform or a specialized computer platform (e.g., a computer platform optimized for retrieving information and sending information to clients), including, but not limited to one or more desktop computers, servers, mainframes, laptop computers, handheld computers, and personal data assistants. In an embodiment, server computer 105 comprises a processor 110, memory 115, storage devices 120, and a network interface 141, which are electrically coupled via bus 112. Network interface 141 is connected to a communications network 145 (e.g., Internet, email network, private or public network) over a public or private telephone, cellular, wireless, satellite, local area and/or wide area network connection 142. Memory 115 is one type of computer-readable medium, and typically comprises random access memory (RAM), read only memory (ROM), integrated circuits, and/or other memory components. Memory 115 typically stores computer-executable instructions to be executed by processor 110 and/or data which is manipulated by processor 110 for implementing the server functionality. Storage devices 120 are another type of computer-readable medium, and typically comprise disk drives, diskettes, networked services, tape drives, and other storage devices. Storage devices 120 typically store computer-executable instructions to be executed by processor 10 and/or data which is manipulated by processor.

Figure 2:
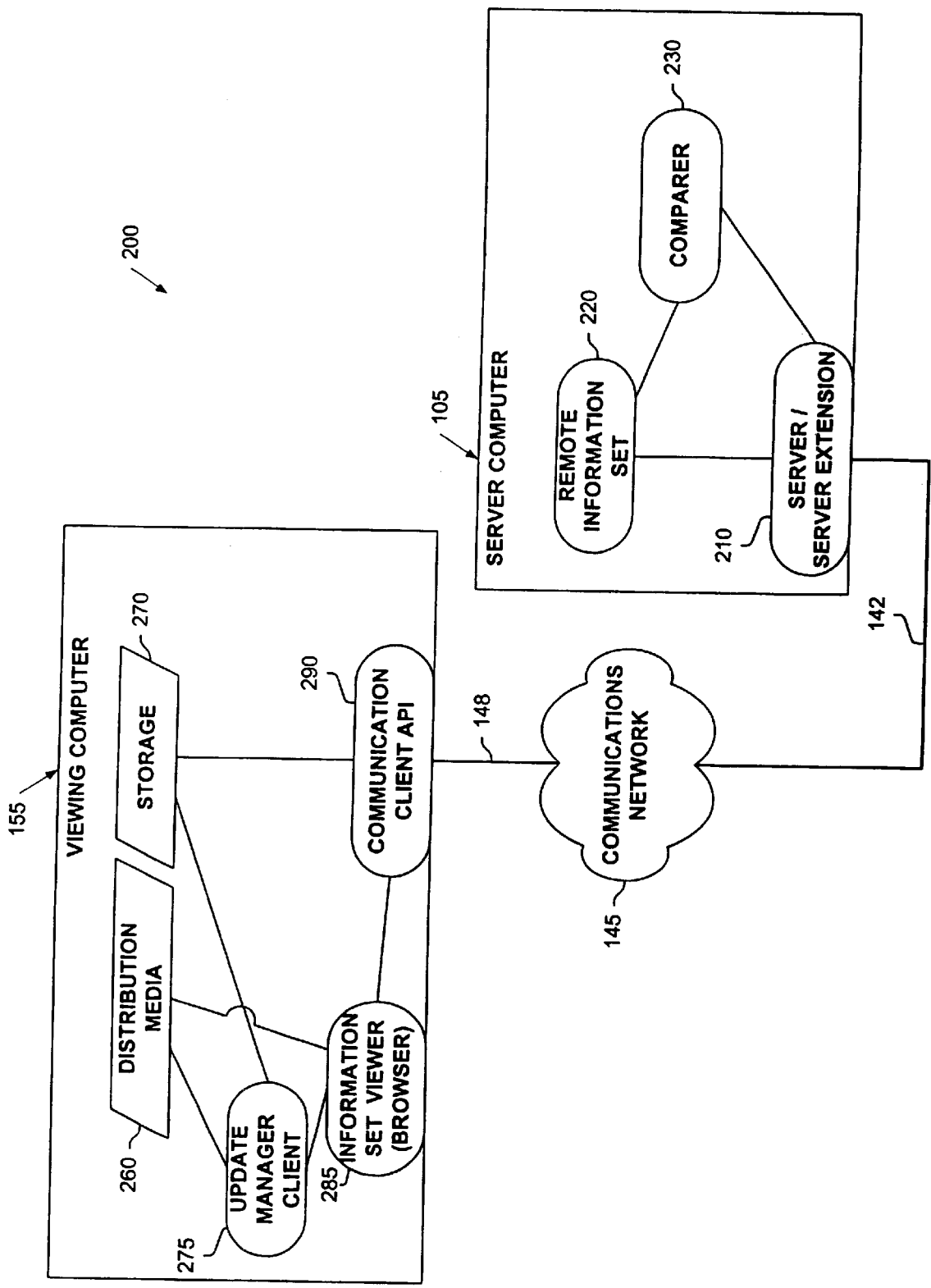
FIG. 2 is a block diagram illustrating an embodiment of the present invention.

Turning now to FIG. 2, illustrated is a representation 200 one of many possible embodiments of the present invention using the client-server arrangement of FIG. 1. Viewing computer 155 comprises a Java-enabled browser running an Information Set Viewer 285 (an applet) to present the information originally contained on distribution media 260. Alternative embodiments of the Information Set Viewer 285 include a standalone program or other process. Initially, distribution media 260 is used exclusively to view the desired information. Subsequent to an update operation controlled by Communication Client API 290 and performed in conjunction with server computer 105, Information Set Viewer 285 is used to view information contained on distribution media 260 and storage 270. Update Manager Client 275 enables Information Set Viewer 285 to access storage 270. After the information has been updated via the update process described herein, a user of the information set browser can view the updated information stored on storage 270 and possibly on distribution media 260; or can revert back to the original information stored on distribution media 260.

For security reasons in a typical browser environment, only limited access by the browser and executing applets is allowed to the local storage devices. For example, certain temporary directories are made available for caching downloaded files. Update Manager Client 275 enables Information Set Viewer 285 secure access to various protected portions of the local storage devices for storage of downloaded information. Update Manager Client 275 acts as a proxy server by receiving requests from Information Set Viewer 285 for files stored on storage 270, retrieves and returns the requested files to Information Set Viewer 285. Information Set Viewer 285 communicates with Update Manager Client 275 using communications sockets, although the invention contemplates using a variety of communications methods including shared memory and other interprocess communications techniques. Because Information Set Viewer 285 knows and trusts Update Manager Client 275, access to storage 270 is provided.

As previously mentioned, Communication Client API 290 controls the update operation performed by viewing computer (client computer) 155. Communication Client API 290 communicates with server computer 105 over communications network 145 and communications links 148 and 142. Server/Server Extension 210 receives requests and downloads files to viewing computer 155. Comparer 230 is used to compare the received index and synchronization files from viewing computer 155 with those provided by Remote Information Set 220, and to generate a modified index for client computer 155. Server/Server Extension 210 downloads the modified index to the viewing computer 155.

Figure 3:
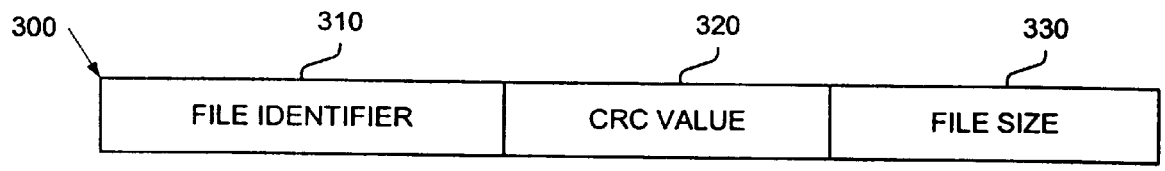
FIG. 3 is a block diagram illustrating an entry maintained in a synchronization file describing a set of files maintained according to the present invention.

Additionally, Server/Server Extension 210 determines and downloads any files needed by viewing computer 155 based on the received synchronization file. Referring to FIG. 3, illustrated is the format of an entry or record 300 within a synchronization file. Entry 300 comprises three fields: file identifier 310 (e.g., identifying the name and path of a file in storage 270); CRC value 320 (e.g., the cyclic redundancy check value of the identified file); and file size 330 (e.g., number of bytes or blocks) of identified file of the current entry 300. Using these values and basic mathematical calculations and comparisons, server computer 105 can determine whether viewing computer 155 has the latest version of each required file by determining whether there is an entry 300 for the file identifier 310, and whether the corresponding entry 300 has the same CRC value 320 and file size 330. Based on these values, server/server extension 210 can download a complete file, or the remaining portion of a file to viewing computer 155.

Figure 6:
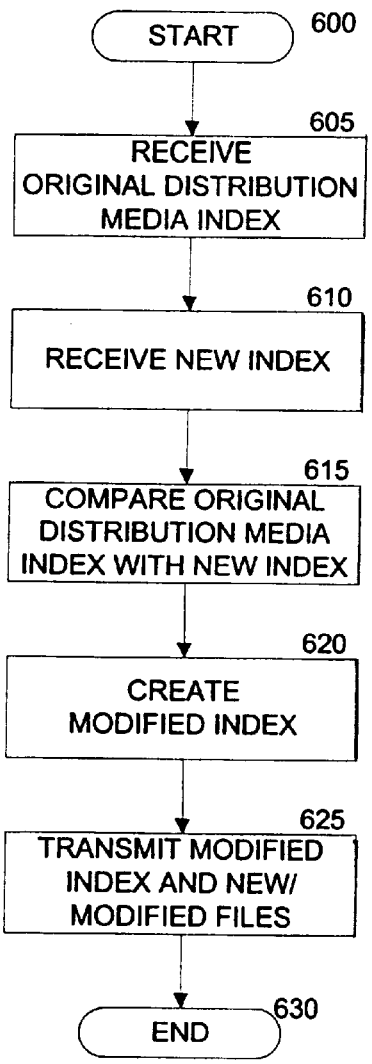
FIG. 6 is a high-level flow diagram illustrating the processing of a server computer system in an embodiment of the present invention.
Figure 4A:
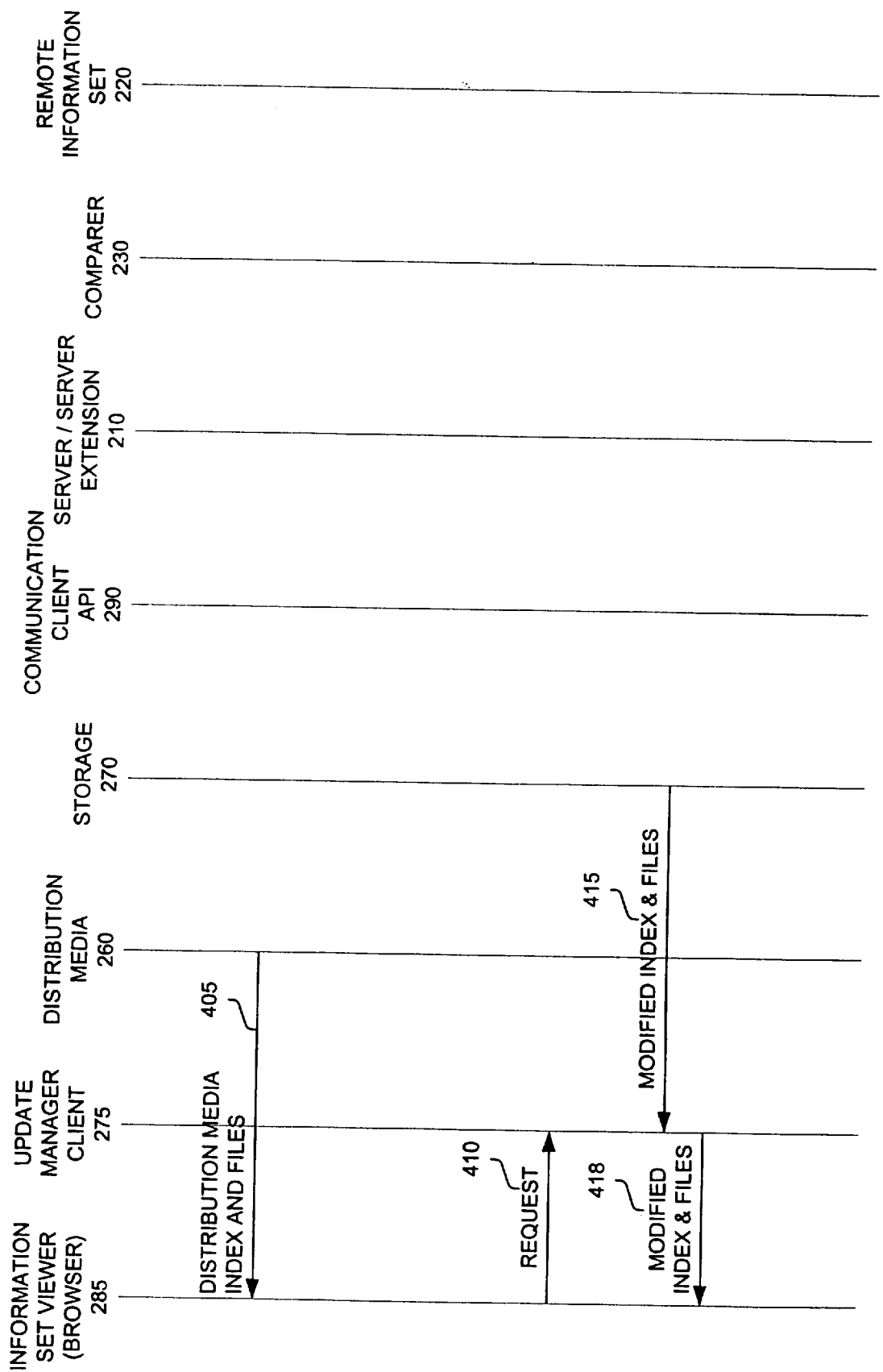
FIGS. 4A–B are data flow diagrams illustrating information exchanging and processing in an embodiment of the present invention.
Figure 4B:
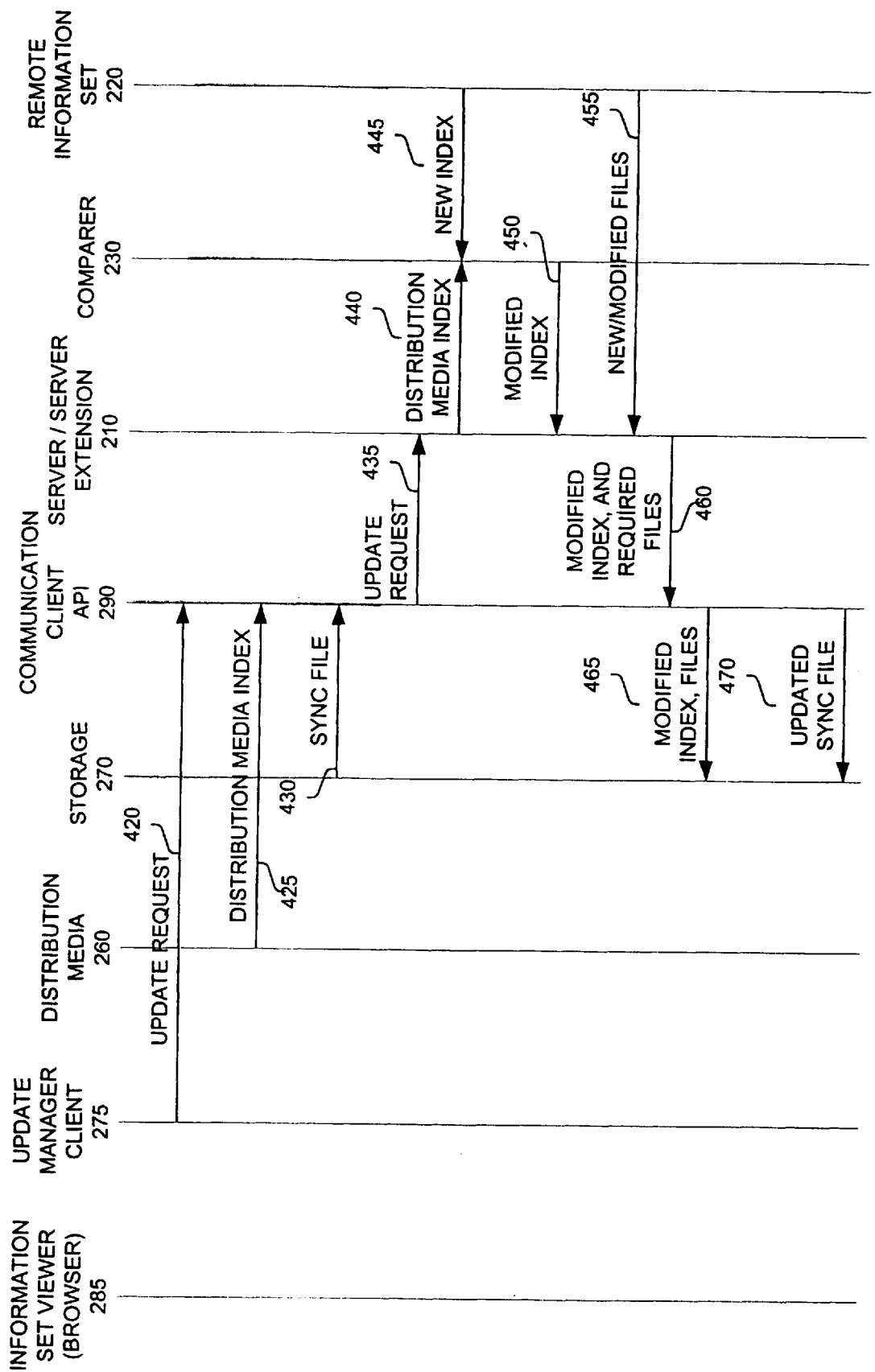
Figure 5:
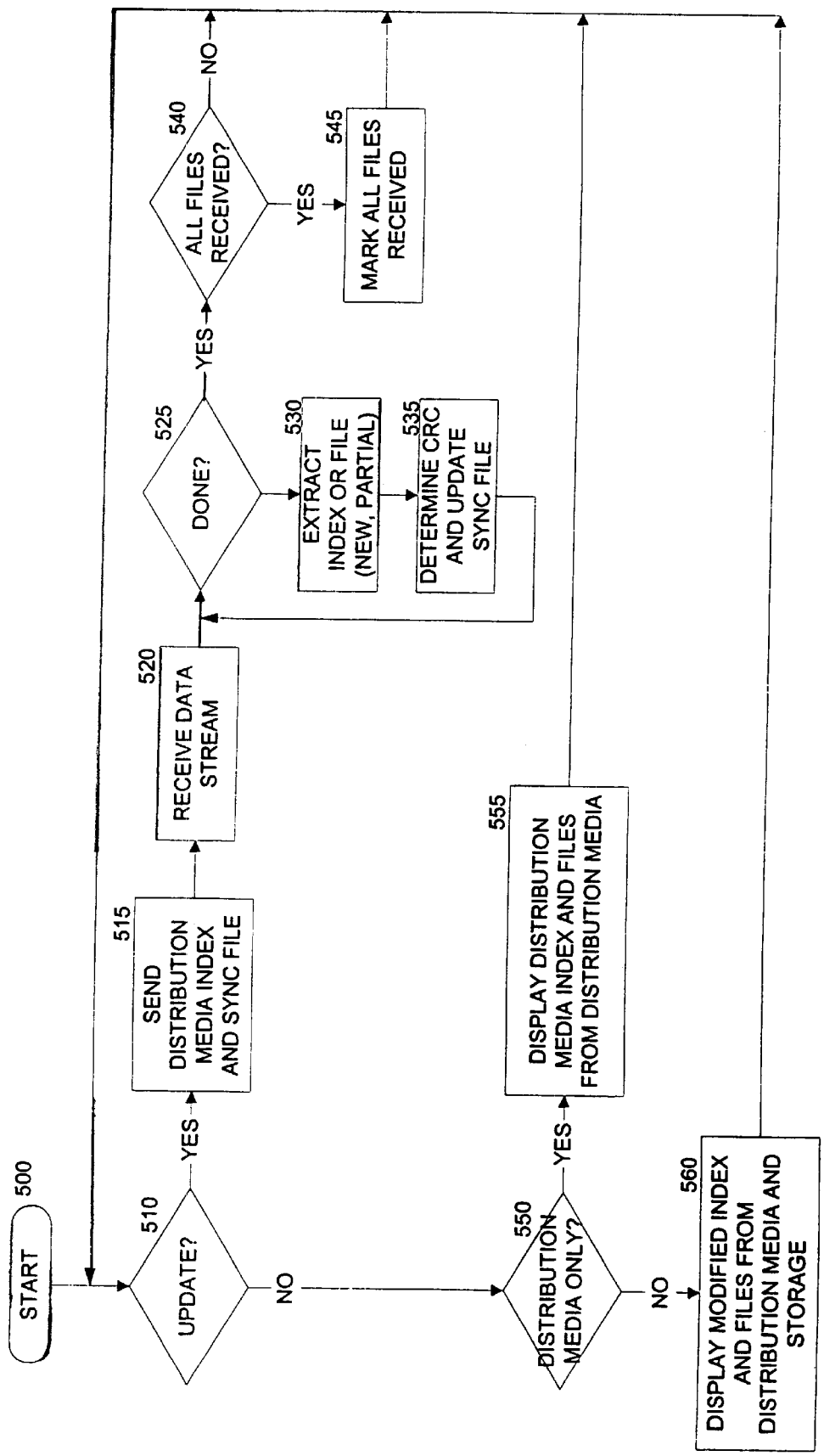
FIG. 5 is a high-level flow diagram illustrating the processing of a computer system in an embodiment of the present invention.

The functionality of these various components will be further described using FIGS. 4–6, to which we now turn. FIGS. 4A–4B are message sequence charts depicting the flow of information among the components illustrated in the block diagram of FIG. 2. Message 405 illustrates a typical original configuration where Information Set Viewer 285 is used to view information stored on distribution media 260. Message sequence 410–418 describes the flow of information for viewing updated information stored on local storage 270. Information Set Viewer 285 provides a request 410 to Update Manager Client 275, which acts a proxy server as previously described. Update Manager Client 275 then retrieves the requested modified index and/or files from storage 270 (message 415), and forwards the information to Information Set Viewer 285 (message 418). Using a received modified index, and based on the flow of information indicated by messages 405–418, information stored on the original distribution media 260 and in local storage 270 can be displayed via Information Set Viewer 285.

Turning now to FIG. 4B, illustrated by messages 420–480 is the flow of information for updating distribution media 260. First, Update Manager Client 275 generates an update request 420 which is received by Communication Client API 290. Next, Communication Client API 290 retrieves the original distribution media index from distribution media 260 (message 425) and the synchronization file from local storage (message 430). Client API forms an update request comprising one or more messages sent to Server/Server Extension 210 (message 435). Next, Comparer 230 receives the original distribution media index from the Server/Server Extension 210, and new index from the Remote Information Set 220 (message 445). Comparer 230 generates and provides the modified index to Server/Server Extension 210 (message 450). Server/Server Extension 210 determines based on the received synchronization file and the modified index the new and modified files that are needed by viewing computer 155, and retrieves these needed files from Remote Information Set 220 (message 455). The modified index and required files are downloaded to viewing computer 155 and received by Communication Client API 290 (message 460). Communication Client API 290 stores the received information in storage 270 (message 465), and maintains an updated synchronization file for the received files (message 470). At this point, the information set originated from the original distribution media has been updated using a remote server, and can be viewed as previously described herein with reference to FIG. 4A.

Turning now to FIG. 5, illustrated is a high-level flow diagram illustrating the steps performed by an embodiment of the client/viewing computer 155 (FIGS. 1, 2). Processing begins with step 500, and proceeds to step 510 where the client computer determines whether an update has been requested or a pending update has not been completed. In an embodiment, a user of the client/viewing computer 155 can selectively determine one or more portions of the distribution media 260 (FIG. 2) that are to be updated. If update has been requested or a pending update has not been completed, step 515 is performed to send the original distribution media index and current synchronization file to the remote server that will provide the update. Next, in step 520, the client computer receives a data stream from the server, and extracts the modified index and files in the loop of steps 525–535. Until done as determined in step 525, the index or file is extracted in step 530. As indicated, the file could be a complete new file, or a partial file. A partial file, instead of a complete file, will typically be provided by the server when a file (especially a large file) was previously incompletely received by the client. Next, for the received file, the corresponding entry (or a new entry) is updated to reflect the received information complete with a file identifier, CRC value, and file size. After all the files have been extracted from the data stream, step 540 is performed to determine if a complete transmission was received from the server (i.e., all files were received). If so, a flag is set in step 545 to indicate that all files were received. In this manner, the client/viewing computer knows that the update was completed and can use this information in step 510. If the update was not completed, the client/viewing computer will try and resume the update operation when processing returns to step 510.

If an update was not requested as determined in step 510, step 550 is performed to determine whether original distribution media is to be viewed in a native or standalone mode base entirely on the contents of the distribution media (and not any downloaded or updated files). If so, the original distribution media index and corresponding files are displayed in step 555. Otherwise, the downloaded modified index and files from both the original distribution media and updated files in local storage are viewed in step 560. Processing then returns to step 510.

Turning now to FIG. 6, illustrated is a high-level flow diagram illustrating the steps performed by an updating server. The Remote Information Set 220 (FIG. 2) can be updated with any frequency (e.g., in real-time, every hour, day, etc.). This frequency is typically a function of the type of information presented (i.e., certain types of information are updated more frequently than others based on their respective temporal lifetime), or based on external factors such as product life cycles.

Processing of FIG. 6 begins with step 600 and proceeds to step 605 where an original distribution media index is received. Next, in step 610, the new index is received from the server representing the updated information set. Next, the original distribution media index is compared with the new index (step 615) to generate a modified index (step 620) for the requesting client computer. Next, the modified index and any required files are transmitted to the requesting client computer in step 625. Processing then ceases for the current request in step 630.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A method comprising:

maintaining a synchronization file, the synchronization file tracking one or more files including a file size value and a cyclic redundancy check value for each of the files;

requesting a distribution media update from a remote server, the distribution media update request including an index from an original distribution media and the synchronization file;

receiving an updated index from the remote server;

receiving one or more supplemental files, the supplemental files supplementing the information contained on the original distribution media;

updating the synchronization file in response to receiving the one or more supplemental files;

displaying an updated version of information originated from the original distribution media based on the received updated index and at least one of the received supplemental files;

reverting back to the original distribution media to use the index from the original distribution media; and displaying a representation of the information originated from the original distribution media.

2. The method of claim 1, wherein the original distribution media is a compact disk (CD) or a digital versatile disk (DVD).

3. The method of claim 1, wherein displaying the updated version is performed by a computer system not connected to the remote server when the updated version is displayed.

4. The method of claim 1, further comprising receiving a selection of items for updating, wherein the update request includes the selection.

5. The method of claim 1, wherein the received updated index and supplemental files are stored in a local data storage, and wherein the updated index contains Universal Resource Locators (URLs) for referencing information contained on the original distribution media and the local data storage.

6. The method of claim 1, wherein the received supplemental files include a partially received file; and the method further comprises receiving from the remote server a remaining portion of the partially received supplemental.

7. The method of claim 1, wherein a first set of files is received supplementing the information contained on the original distribution media in response to a sent first distribution media update request, and a second set of files is received supplementing the information contained on the original distribution media in response to a sent resumption of the sent first distribution media update request.

8. A method comprising:

maintaining a synchronization file on a secure portion of a local storage device not normally accessible by a browser, the synchronization file tracking a set of local files including a file size value and a cyclic redundancy check value for each of the local files;

requesting a distribution media update from a remote server, the distribution media update request including an index from an original distribution media and the synchronization file;

receiving an updated index from the remote server;

receiving one or more supplemental files, the supplemental files supplementing the information contained on the original distribution media;

storing the received one or more supplemental files on the secure portion of the local storage device;

updating the synchronization file in response to receiving the one or more supplemental files;

displaying the updated version of information originated from the original distribution media based on the received updated index and at least one of the received supplemental files stored on the secure portion of the local storage device;

reverting back to the original distribution media to use the index from the original distribution media; and displaying a representation of the information originated from the original distribution media.

9. The method of claim 8, wherein the original distribution media is a compact disk (CD) or a digital versatile disk (DVD).

10. The method of claim 8, further comprising receiving a selection of items for updating, wherein the update request includes the selection.

11. The method of claim 8, wherein the received updated index and supplemental files are stored on the secure portion of the local storage device, and wherein the updated index contains Universal Resource Locators (URLs) for referencing information contained on the original distribution media and the secure portion of the local storage device.

12. The method of claim 8, wherein the received files include a partially received file; and the method further comprises receiving from the remote server a remaining portion of the partially received file.

* * * * *